United States Patent
Barton et al.

(10) Patent No.: US 10,979,918 B2
(45) Date of Patent: Apr. 13, 2021

(54) IDENTIFICATION AND REMEDIATION OF MESH INSTABILITY SOURCE IN A MESH NETWORK

(71) Applicant: Cisco Technology, Inc., San Jose, CA (US)

(72) Inventors: Robert Edgar Barton, Richmond (CA); Jerome Henry, Pittsboro, NC (US); Xiaoguang Jason Chen, San Jose, CA (US); Rupak Chandra, Fremont, CA (US); Ibrahim Mortada, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 326 days.

(21) Appl. No.: 16/195,987

(22) Filed: Nov. 20, 2018

(65) Prior Publication Data

US 2020/0162944 A1    May 21, 2020

(51) Int. Cl.
*H04W 24/04*   (2009.01)
*H04W 84/18*   (2009.01)

(52) U.S. Cl.
CPC ........... *H04W 24/04* (2013.01); *H04W 84/18* (2013.01)

(58) Field of Classification Search
CPC .............................. H04W 24/04; H04W 84/18
See application file for complete search history.

(56) References Cited

U.S. PATENT DOCUMENTS 8,228,954 B2    7/2012   Thubert et al.
9,218,216 B2    12/2015  Vasseur et al.
9,277,482 B2 *  3/2016   Vasseur .................. H04L 45/70
(Continued)

OTHER PUBLICATIONS

Yang et al., Stability Metric Based Routing Protocol for Low-Power and Lossy Networks:, [online], Mitsubishi Electric Research Laboratories, Jun. 2014, [retrieved on Nov. 3, 2017]. Retrieved from the Internet: URL: <http://ai2-s2-pdfs.s3.amazonaws.com/170f/eeda3b7b05c19327f0a1ea743fd83ec86120.pdf>, 8 pages.
(Continued)

*Primary Examiner* — Kodzovi Acolatse
*Assistant Examiner* — Farhad Ali
(74) *Attorney, Agent, or Firm* — Leon R. Turkevich

(57) ABSTRACT

In one embodiment, a method comprises identifying, by an apparatus, a mesh instability source device that adds a substantial instability influence that substantially degrades network communications in a mesh network, including: determining, for each mesh network device in the mesh network, a corresponding node stability contribution that identifies a long-term capability of the corresponding mesh network device to provide reliable communications for other mesh network devices in the mesh network, and determining a corresponding influence of the node stability contribution on child mesh network devices relying on the corresponding mesh network device for connectivity in the mesh network, and identifying the mesh instability source device as having a corresponding worst influence of the node stability contribution in the mesh network; and eliminating the substantial instability influence based on determining a remediation solution, and causing the remediation solution to be implemented for the mesh instability source device.

20 Claims, 6 Drawing Sheets

(56) References Cited

U.S. PATENT DOCUMENTS

| | | | |
|---|---|---|---|
| 9,407,559 B2* | 8/2016 | Guo | H04W 40/026 |
| 9,596,180 B2 | 3/2017 | Thubert et al. | |
| 2015/0200810 A1 | 7/2015 | Vasseur et al. | |
| 2016/0191357 A1 | 6/2016 | Omer et al. | |
| 2017/0078170 A1 | 3/2017 | Vasseur et al. | |
| 2017/0251387 A1 | 8/2017 | Rossebo et al. | |
| 2017/0353292 A1 | 12/2017 | Thubert et al. | |

OTHER PUBLICATIONS

Cisco, "Connected Utilities—Field Area Network 2.0 Design and Implementation Guide", [online], Jan. 2016, [retrieved on Oct. 10, 2018]. Retrieved from the Internet: URL: <https://www.cisco.com/c/en/us/td/docs/solutions/Verticals/Utilities/FAN/2-0/CU-FAN-2-DIG.pdf>, 182 pages.

Gnawali et al., "The Minimum Rank with Hysteresis Objective Function", Internet Engineering Task Force (IETF), Request for Comments: 6719, Sep. 2012, pp. 1-13.

\* cited by examiner

IDENTIFICATION AND REMEDIATION OF MESH INSTABILITY SOURCE IN A MESH NETWORK

TECHNICAL FIELD

The present disclosure generally relates to identification and remediation of a mesh instability source in a mesh network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Large-scale wireless mesh networks can be deployed in the form of Internet Protocol version 6 (IPv6) wireless radio frequency (RF) mesh networks, deployed for example using IEEE 802.15.4e and/or IEEE 802.15.4g (referred to herein as "IEEE 802.15.4e/g"). Such large-scale wireless mesh networks can be used for deployment of, for example, a connected grid mesh (CG-mesh) network advanced metering infrastructure (AMI). The CG-mesh network can include thousands of IEEE 802.15.4e/g based low-power network devices, where each network device can reach, within its transmission range, hundreds of neighboring network devices.

Large-scale deployment of such IPv6 RF mesh networks, however, results in increased difficulty in effective management of such IPv6 RF mesh networks, especially since such deployments rely on a tree-based topology implemented, for example, using a routing protocol for low power and lossy networks (RPL) according to the Internet Engineering Task Force (IETF) Request for Comments (RFC) 6550: such a tree-based topology often results in a child network device inheriting communication problems associated with a parent network device in the tree-based topology.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
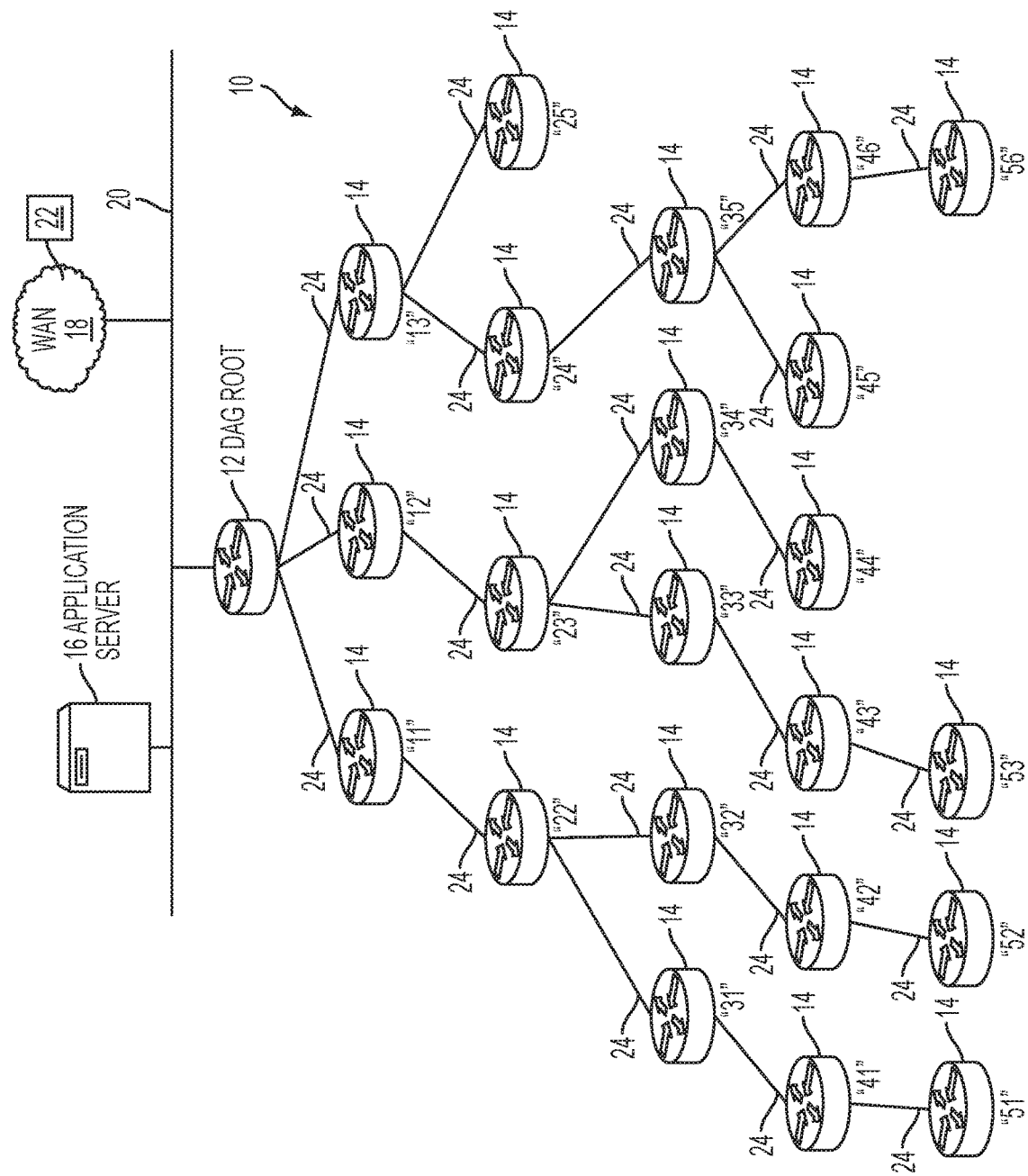
FIG. 1 illustrates an example system having an apparatus for executing identification and remediation of a mesh instability source device that degrades network communications in a mesh network, according to an example embodiment.

In one embodiment, a method comprises identifying, by an apparatus, a mesh instability source device that adds a substantial instability influence that substantially degrades network communications in a mesh network. The identifying includes determining, for each mesh network device in the mesh network, a corresponding node stability contribution that identifies a long-term capability of the corresponding mesh network device to provide reliable communications for other mesh network devices in the mesh network. The identifying also includes determining a corresponding influence of the node stability contribution on child mesh network devices relying on the corresponding mesh network device for connectivity in the mesh network, and identifying the mesh instability source device as having a corresponding worst influence of the node stability contribution in the mesh network. The method further comprises eliminating, by the apparatus, the substantial instability influence in the mesh network based on determining a remediation solution for the mesh instability source device, and causing the remediation solution to be implemented for the mesh instability source device.

In another embodiment, an apparatus is implemented as a physical machine. The apparatus comprises non-transitory machine readable media configured for storing executable machine readable code; a device interface circuit configured for receiving data associated with mesh network devices in a mesh network; and a processor circuit. The processor circuit is configured for executing the machine readable code, and when executing the machine readable code operable for: identifying a mesh instability source device that adds a substantial instability influence that substantially degrades network communications in the mesh network. The identifying includes determining, for each mesh network device in the mesh network, a corresponding node stability contribution that identifies a long-term capability of the corresponding mesh network device to provide reliable communications for other mesh network devices in the mesh network. The identifying also includes determining a corresponding influence of the node stability contribution on child mesh network devices relying on the corresponding mesh network device for connectivity in the mesh network, and identifying the mesh instability source device as having a corresponding worst influence of the node stability contribution in the mesh network. The processor circuit, when executing the machine readable code further is operable for eliminating the substantial instability influence in the mesh network based on determining a remediation solution for the mesh instability source device, and causing the remediation solution to be implemented for the mesh instability source device.

In another embodiment, one or more non-transitory tangible media is encoded with logic for execution by a machine and when executed by the machine operable for identifying, by the machine, a mesh instability source device that adds a substantial instability influence that substantially degrades network communications in a mesh network. The identifying includes: determining, for each mesh network device in the mesh network, a corresponding node stability contribution that identifies a long-term capability of the corresponding mesh network device to provide reliable communications for other mesh network devices in the mesh network, determining a corresponding influence of the node stability contribution on child mesh network devices relying on the corresponding mesh network device for connectivity in the mesh network, and identifying the mesh instability source device as having a corresponding worst influence of the node stability contribution in the mesh network. The one or more non-transitory tangible media further is operable for eliminating, by the machine, the substantial instability influence in the mesh network based on determining a remediation solution for the mesh instability source device, and causing the remediation solution to be implemented for the mesh instability source device.

DETAILED DESCRIPTION

Particular embodiments enable automated optimization of a large-scale mesh network based on an apparatus configured for identifying, within the mesh network, a mesh instability source device that adds a substantial instability influence that substantially degrades network communications in the mesh network. The apparatus, in response to identifying the mesh instability source device that substantially degrades the network communications in the mesh network, can determine a remediation solution for the mesh instability source device, and cause the remediation solution to be implemented for elimination of the substantial instability influence in the mesh network.

Hence, the example embodiments enable automated and dynamic identification of a problematic mesh network device, referred to herein as "mesh instability source device", that can often cause various types of degradation in network communications (e.g., network performance, network communications reliability, etc.). The example embodiments enable the identification and remediation of the mesh instability source device even in large scale mesh networks (e.g., IEEE 802.15.4e/g networks) such as CG-mesh that can include tens of thousands of wireless mesh network devices.

As described below, the example embodiments can identify, even from among tens of thousands of wireless mesh network devices, the mesh instability source device that substantially degrades the network communications based on: determining, for each mesh network device, a corresponding node stability contribution; the node stability contribution identifies a long-term capability of the corresponding mesh network device to provide reliable communications for other mesh network devices in the mesh network. The example embodiments also can identify the mesh instability source device based on determining a corresponding influence of the node stability contribution (by a given mesh network device) on child mesh network devices relying on the corresponding mesh network device for connectivity in the mesh network. Hence, the example embodiments can identify the mesh instability source device as having the corresponding worst influence of the node stability contribution in the mesh network.

Hence, the example embodiments can automatically eliminate the substantial instability influence in the mesh network based on determining a remediation solution for the identified mesh instability source device, and causing the remediation solution to be implemented for the mesh instability source device. The remediation solution can include any one of an instruction for the identified instability source device (and/or its parent device) to change one or more communications parameters, for example a change in data rate, a change in transmission or reception frequency, a change in transmitter and/or receiver gain for transmission and/or transmission of wireless data signals, a change in network topology (e.g., the identified instability source device changes to a different parent device having improved transmission characteristics), etc.

FIG. 1 illustrates an example wireless mesh data network 10, for example an IEEE 802.15.4e/g based CG-mesh network having a mesh network device 12 operating as a directed acyclic graph (DAG) root for multiple mesh network devices 14, operating as RPL nodes according to RFC 6550, according to an example embodiment. The DAG root 12 can serve as a "sink" for the mesh network devices 14, for example for reaching a server device 16 and/or a wide area network (WAN) (e.g., the Internet) 18 via a backbone link 20 (e.g., for reaching a remote network device 22 reachable via the WAN 18).

The DAG root 12 can configured for causing creation of a tree-based topology overlying the link layer mesh data network 10 based on transmitting one or more DODAG information object (DIO) messages. The wireless mesh data network 10 can be implemented as a Low-power and Lossy Network (LLN) that can include dozens or thousands of low-power wireless mesh network devices 14 each configured for routing data packets according to a routing protocol designed for such low power and lossy networks, for example RPL: such low-power router devices can be referred to as "RPL nodes"; hence, a wireless mesh network device 14 also can be referred to herein as a "RPL node". Each RPL node 14 in the LLN typically is constrained by processing power, memory, and energy (e.g., battery power); interconnecting wireless data links 24 between the RPL nodes 14 typically are constrained by high loss rates, low data rates, and instability with relatively low packet delivery rates.

A network topology (e.g., a "RPL instance" according to RFC 6550) can be established based on creating routes toward a single "root" network device (e.g., a backbone router) 12 in the form of a directed acyclic graph (DAG) toward the DAG root 12, where all routes in the LLN terminate at the DAG root 12 (also referred to as a "DAG destination"). Hence, the DAG also is referred to as a Destination Oriented DAG (DODAG). Network traffic can move either "up" towards the DODAG root 12 or "down" towards the DODAG leaf nodes (e.g., nodes "51", "52", "53", "44", "45", "56").

The DODAG can be formed based on a DODAG information object (DIO) advertised by the DAG root 12, where a "child" network device (e.g., "11", "12", and/or "13") 14 detecting the DIO can select the DAG root 12 as a parent in the identified DODAG based on comparing network topology metrics (advertised in the DIO) to a prescribed objective function of the RPL instance. The "child" network device 14, upon attaching to its parent, can output its own DIO with updated network topology metrics that enable other wireless mesh network devices 14 to discover the DODAG, learn the updated network topology metrics, and select a DODAG parent. As described in further detail below, the example embodiment also enables advertisement of additional performance metrics that describe the stability of the DODAG and/or wireless mesh network devices 14 in the DODAG.

A single instance of the DODAG or DAG also is referred to as a Personal Area Network (PAN). Hence, a wireless mesh data network 10 can include a plurality of PANs (not shown in FIG. 1), where each PAN includes one DAG root 12 (exclusively allocated to the PAN) and multiple wireless mesh network devices 14 connected exclusively within the PAN according to the DIO messages originated by the corresponding one DAG root 12. Hence, unless explicitly stated otherwise herein, a wireless mesh network device 14 is configured to belong to only one PAN at a time, i.e., a wireless mesh network device 14 is configured to be attached only within one DODAG, although the wireless mesh network device 14 can be configured for attachment to one or more parent network devices 14 within a single DODAG.

Downward routes (i.e., away from the DAG root) can be created based on Destination Advertisement Object (DAO) messages that are created by a wireless mesh network device 14 and propagated toward the DAG root 12. The RPL instance can implement downward routes in the DAG of the LLN in either a storing mode only (fully stateful), or a non-storing mode only (fully source routed by the DAG root), or a combination thereof (e.g., some parent network devices operate in storing mode and one or more child network devices operate in non-storing mode only). In storing mode, a RPL node unicasts its DAO message to its parent node, such that RPL nodes can store downward routing tables for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

Each mesh network device 14 in the wireless mesh data network 10 can be configured for operating in storing mode, non-storing mode, and/or a combination thereof. Hence, each wireless mesh network device 14 can unicast transmit its DAO message to its parent (and/or the DAG root 12) in accordance with RFC 6550. The DAG root 12, in response to receiving the DAO messages from the RPL nodes 14, can build the entire DAG topology and store the DAG topology in its memory circuit 34 (illustrated in FIG. 2), including storage of heuristics of usage, path length, knowledge of device capacity, link reliability, etc.

A wireless mesh network device 14 can operate as a parent network device (e.g., "22" of FIG. 1) for an attached "child" RPL node (e.g., "31"). For example, in response to a parent network device "41" receiving a data packet originated by its child network device "51" 14, the parent network device "41" can cache a downward path (i.e., away from the DAG root 12) that the target device "51" 14 is reachable via a given egress interface on the parent device "41" (e.g., output to an IPv6 address "41::51") that is the attachment address of the target device "51"); the next parent network device "31", in response to receiving the data packet from its child RPL node "41", can cache the downward path that the target device "51" 14 is reachable via the child RPL node "41"; the next parent network device "22", in response to receiving the data packet from its child RPL node "31", can cache the downward path that the target device "51" 14 is reachable via the child RPL node "31"; and the next parent network device "11", in response to receiving the data packet from its child RPL node "22", can cache the downward path that the target device "51" 14 is reachable via the child RPL node "22".

Hence, each of the parent network devices "41", "31", "22", and "11" 14 can execute a caching (e.g., a transient caching on a temporary basis) of a downward path (i.e., away from the DAG root 12) for reaching the target network device "51" 14, independent of any route table entry in the parent network device; moreover, a common parent device (e.g., "22") 14 can cache downward paths toward multiple "target devices" (e.g., network devices "51" and "52") within its sub-DAG, such that a data packet originated by one RPL node "51" and destined toward another RPL node "52" can be forwarded by the common parent device (e.g., "22") to the corresponding parent device "32" of the destination target "52" eliminating the necessity that the data packet be forwarded via the default route toward the DAG root 12.

A particular issue of the DODAG topology of FIG. 1 is that any instability encountered by a mesh network device (e.g., network device "22") can be inherited by the child network devices "31", "32", "41", "42", "51", and "52" 14 in the subDAG of the affected mesh network device. In other words, each child mesh network device (e.g. "51", "52") can inherit the aggregated instability of its parents; hence, a mesh network device (e.g., "42") 14 that is further within the DODAG topology may encounter substantially degraded network performance, even though each of the parent network devices "32", "22", and "11" individually report moderately stable mesh stability metrics. Further, if the instability encountered by a parent network mesh device (e.g., network device "22") 14 is substantially sufficient, the parent network mesh device (e.g., network device "22") 14 can substantially degrade network communications within the entire subDAG: such degradation in network communications can be substantial in cases where each parent network device can have hundreds of child network devices.

Hence, the example embodiments can identify the mesh instability source device that substantially degrades network communications in the wireless mesh data network 10 based on determining a node stability contribution by a given mesh network device (e.g., "22"), and determining the corresponding influence of the node stability contribution (by a given mesh network device) on child mesh network devices relying on the corresponding mesh network device for connectivity in the mesh network. Hence, the example embodiments can identify the mesh instability source device as having the corresponding worst influence of the node stability contribution in the mesh network 10.

Figure 2:
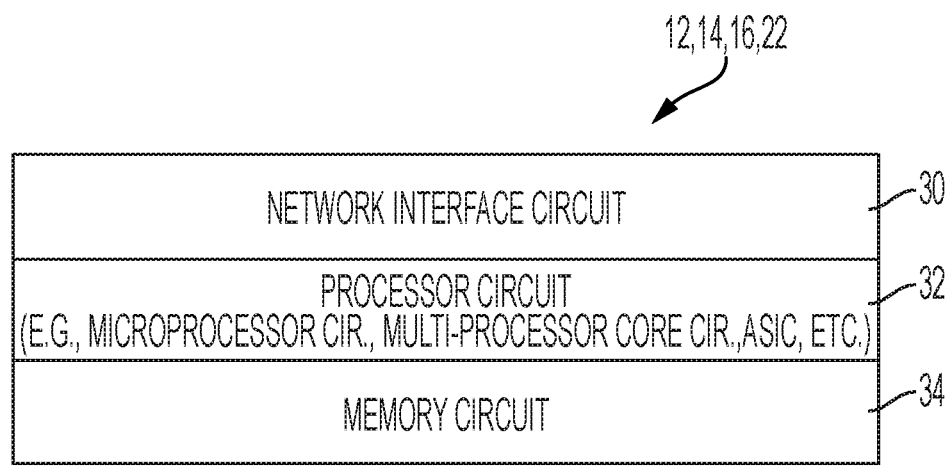
FIG. 2 illustrates an example implementation of any one of the devices of FIG. 1, according to an example embodiment.

FIG. 2 illustrates an example implementation of any one of the devices 12, 14, 16, and/or 22 of FIG. 1, according to an example embodiment.

Each apparatus 12, 14, 16, and/or 22 can include a device interface circuit 30, a processor circuit 32, and a memory circuit 34. The device interface circuit 30 can include one or more distinct physical layer transceivers for communication with any one of the other devices 12, 14, 16, and/or 22; the device interface circuit 30 also can include an IEEE based Ethernet transceiver for communications with the devices of FIG. 1 via any type of data link (e.g., a wired or wireless link, an optical link, etc.), for example a wireless IEEE 802.15.4e/g data link. The processor circuit 32 can be configured for executing any of the operations described herein, and the memory circuit 34 can be configured for storing any data or data packets as described herein. The term "configured for" or "configured to" as used herein with respect to a specified operation refers to a device and/or machine that is physically constructed and arranged to perform the specified operation.

Any of the disclosed circuits of the devices 12, 14, 16, and/or 22 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Figure 3A:
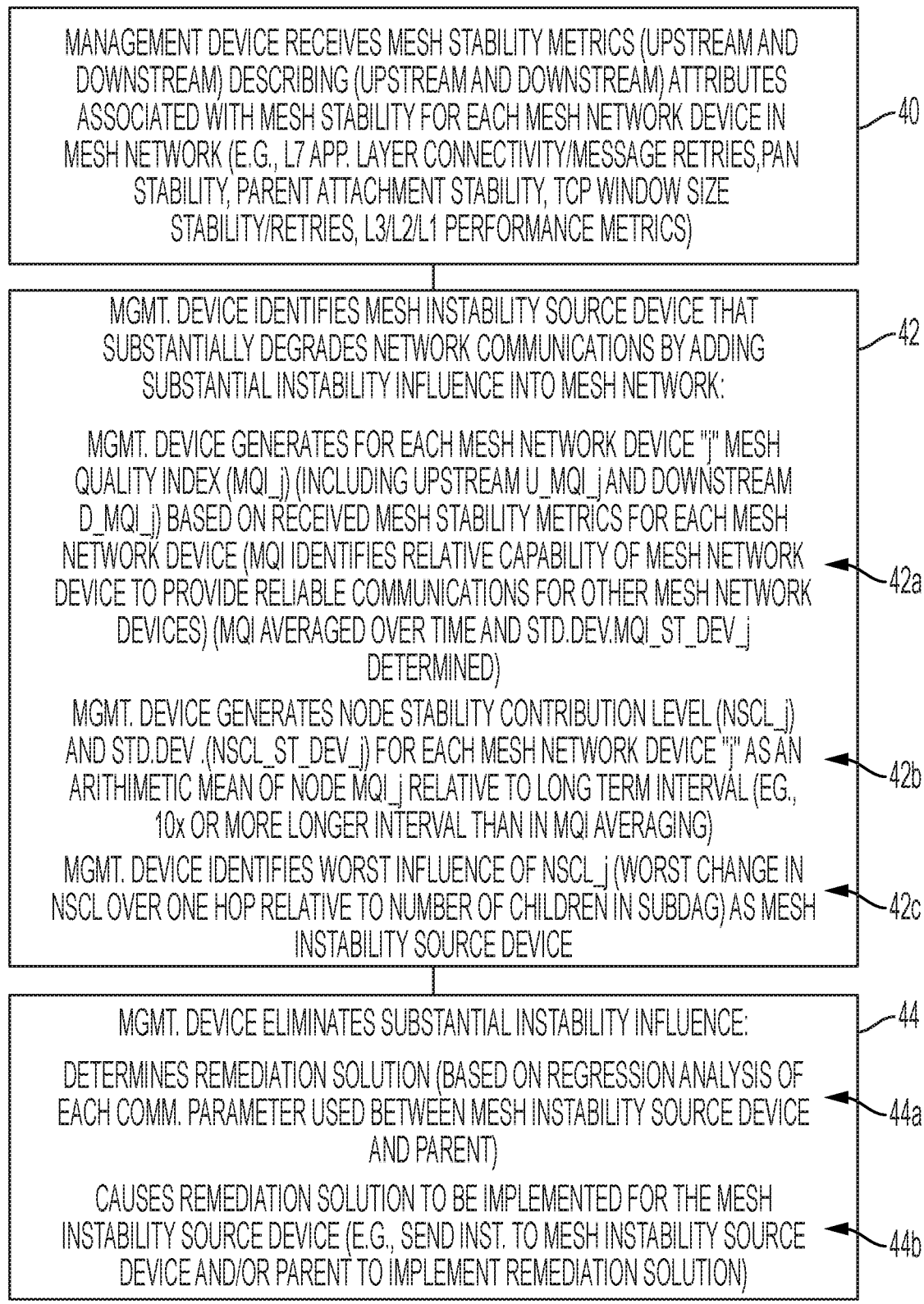
FIGS. 3A and 3B illustrate an example method for identification and remediation of a mesh instability source device in the mesh network of FIG. 1, according to an example embodiment.
Figure 3B:
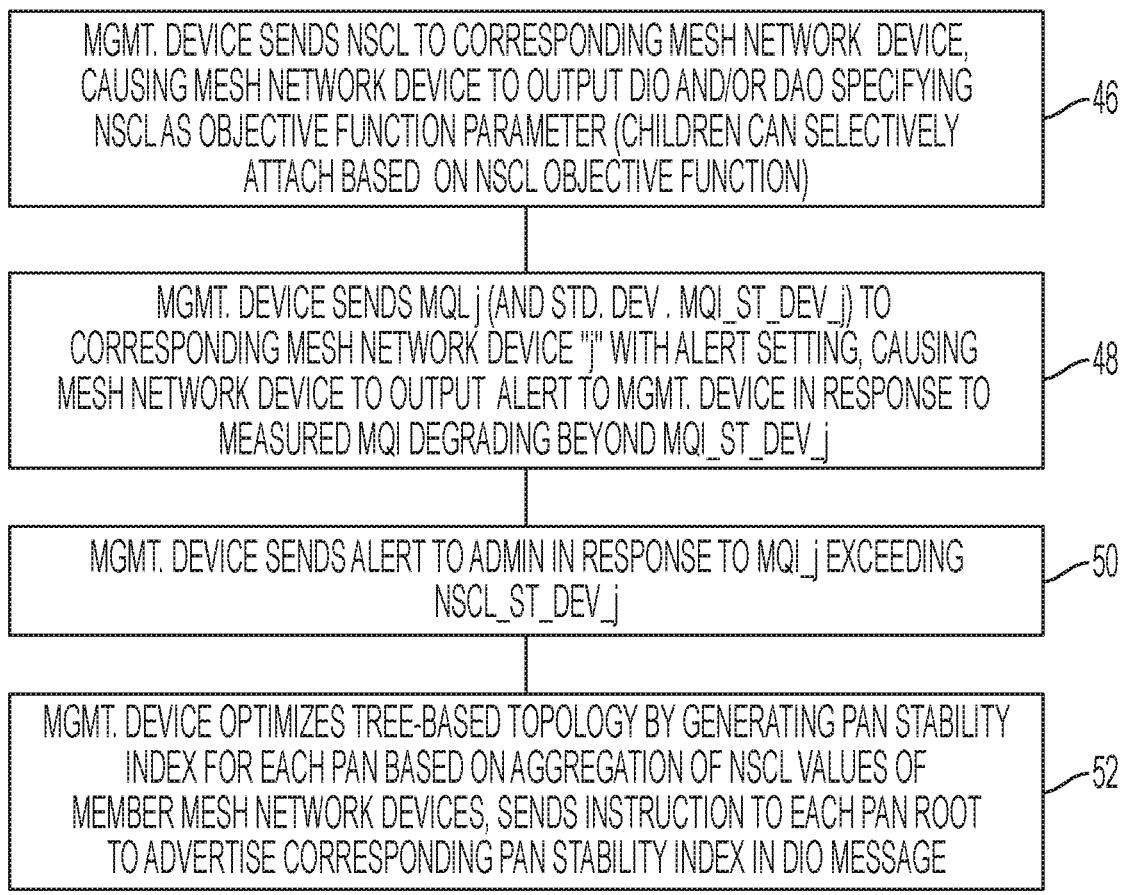

FIGS. 3A and 3B illustrate an example method for identification and remediation of a mesh instability source device in the mesh network of FIG. 1, according to an example embodiment. The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Referring to FIGS. 1 and 3A, any one of the server device 16 and/or the remote network device 22 can be implemented as a management device configured for executing the operations described herein for identification and remediation of a mesh instability source in the wireless mesh data network 10. Hence, any reference to "management device" refers to any one of the server device 16 and/or the remote network device 22.

Referring to FIG. 3A, each wireless mesh network device 14 can be configured for sending to the management device 16 and/or 22 various key performance metrics (KPIs) that can be used by the management device 16 and/or 22 to quantify as mesh stability metrics for upstream and/or downstream communications by the corresponding wireless mesh network device 14. For example, the processor circuit 32 of a wireless mesh network device 14 can send to the management device 16 and/or 22 KPIs detected by the processor circuit 32 of the wireless mesh network device 14, including KPI metrics from the physical layer (L1) up to and including application layer (L7) metrics. The processor circuit 32 of the management device 16 and/or 22 in operation 40 also can execute a periodic polling of each wireless mesh network device 14 for the mesh stability metrics, for example according to a prescribed polling schedule. Hence, the processor circuit 32 of the management device 16 and/or 22 in operation 40 can receive mesh stability metrics for both upstream and downstream communications that describe attributes associated with mesh stability for each mesh network device 14 in the wireless mesh data network 10.

The processor circuit 32 of the management device 16 and/or 22 can receive upstream and downstream mesh stability metrics based on receiving associated metrics from a transmitting mesh network device 14, and a receiving mesh network device 14. For example, the processor circuit 32 of the mesh network device "22" 14 can detect and store in its memory circuit 34 a data structure identifying mesh stability metrics measuring physical layer (L1), link layer (L2), and network layer (L3) transmission characteristics associated with transmitting a data packet to a child network device (e.g., "31") 14; the processor circuit 32 of the child network device "31" 14 also can detect and store in its memory circuit 34 a data structure identifying mesh stability metrics measuring physical layer (L1), link layer (L2), and network layer (L3) reception characteristics associated with receiving the data packet from its parent network device "22" 14; hence, the processor circuit 32 of the management device 16 and/or 22 can determine the "downstream" mesh stability metrics associated with transmitting a data packet from the parent network device "22" to its child network device "31" based on receiving the associated mesh stability metrics from the parent network device "22" and the child network device "31". Similarly, the processor circuit 32 of the management device 16 and/or 22 can determine the "upstream" mesh stability metrics associated with transmitting a data packet from the child network device "31" to its parent network device "22" based on receiving the associated mesh stability metrics from the parent network device "22" and the child network device "31". Higher-layer mesh stability metrics can be sent for multi-hop source-destination pairs to the management device 16 and/or 22, for example for transport layer (L4) (e.g., TCP) metrics up to application layer (L7) metrics.

For example, the processor circuit 32 of a wireless mesh network device 14 can send its own physical layer (L1) transmission characteristics (e.g., transmit (Tx) power transmission, transmit frequency channel(s) used, bit error rate, data transmission rate, signal to noise ratio, etc.), L1 reception characteristics (e.g., receive power in dBm, signal to noise ratio, detected bit error rate, data transmission rate, etc.), link layer (L2) transmission or reception characteristics. The processor circuit 32 of a wireless mesh network device 14 also can send mesh stability metrics with respect to application layer connectivity, including for example statistics associated with transmission and/or reception of keepalive messages, retry messages, etc. (similar mesh stability metrics with respect to application layer connectivity can be sent by an application server 16 executing the corresponding application, for example based on identifying the corresponding wireless mesh network device 14 communicating with the server device 16).

Additional link layer stability metrics can include a Personal Area Network (PAN) stability identifying whether the mesh network device maintains a connection within a single PAN or switches between different PANs, parent device stability identifying whether the mesh network device maintains connection with a single parent device or switches between different parent devices, or transmission retries. Each wireless mesh network device 14 also can be configured for sending the KPIs to an alternate storage location via the wireless mesh data network 10, for example a mass storage device reachable via the management device.

In response to receiving (or retrieving from a mass storage device) the various mesh stability metrics in operation 40, the processor circuit 32 of the management device 16 and/or 22 in operation 42 can identify the mesh instability source device that adds a substantial instability influence that substantially degrades network communications in a mesh network. In particular, the management device can generate for each mesh network device "j" 14 a corresponding mesh quality index "MQI_j" based on the received upstream and downstream mesh stability metrics associated with the mesh network device "j" 14; in other words, the mesh stability metrics associated with the mesh network device "j" 14 can include mesh stability metrics detected and generated by the mesh network device "j", and mesh stability metrics detected and generated by a network device in communication with the mesh network device "j". The mesh quality index "MQI_j" can include an upstream component "U_MQI_j" that identifies a capability of the mesh network device "j" over time to provide reliable communications for one or more mesh network devices upstream of the mesh network device "j" (i.e., traffic from the mesh network device "j" toward the DAG root 12 via its corresponding parent network device). The mesh quality index "MQI_j" also can include a downstream component "D_MQI_j" that identifies a capability of the mesh network device "j" over time to provide reliable communications for one or more mesh network devices downstream of the mesh network device "j" (i.e., traffic from the mesh network device "j" toward one or more of its child network devices and away from the DAG root 12).

The mesh quality index "MQI_j" for a mesh network device "j" can be calculated by the processor circuit 32 of the management device 16 and/or 22 as a trending value over time based on a plurality of measured mesh stability metrics. An example of mesh quality index "MQI_j" calculation can be based on the processor circuit 32 of the management device 16 and/or 22 calculating a sum of the following parameters, where each parameter is allocated a value between "−1" and "+1":

(1) L7 Connectivity: a score of "−1" is allocated by the management device 16 and/or 22 for example if the mesh network device "j" cannot connect to the server device 16 or the remote network device 22 via the wireless mesh data network 10 (e.g., a smart meter could not be read by the server device 16 or the remote network device 22, or if multiple retries were required, etc.), whereas a score of "+1" is allocated by the management device 16 and/or 22 if the mesh network device "j" was able to successfully connect to the server device 16 or the remote network device 22 via the wireless mesh data network 10 (e.g., successful transmission of smart meter readings, keepalive messages, no retries, etc.);

(2) Transmission Retries (Number of L7/L4 and/or L2 Transmission retries since last poll (Path Tx)): a high retransmission rate by the mesh network device "j" would result in the management device 16 and/or 22 allocating a "−1" score, whereas a low retransmission rate would result in the management device 16 and/or 22 allocating a "+1" score;

(3) PAN stability: the management device 16 and/or 22 can allocate a score of "−1" in response to the management device 16 and/or 22 determining the mesh network device "j" changes its PAN (i.e., changes to a different DODAG having a different DAG root 12), whereas the management device 16 and/or 22 can allocate a score of "+1" in response to the mesh network device "j" maintaining its attachment as a stable member of a single PAN rooted at the same DAG root 12;

(4) Parent Stability: the management device 16 and/or 22 can allocate a score of "−1" in response to the management device 16 and/or 22 determining the mesh network device "j" changes its parent network device to an alternative parent, whereas the management device 16 and/or 22 can allocate a score of "+1" in response to the mesh network device "j" maintaining its attachment as a stable parent in the DODAG; if the wireless mesh data network 10 and the DODAG are implemented to permit multiple parents, a negative to positive range can be implemented (e.g., "−2" to "+2") depending on whether a mesh network device "j" moves from a preferred parent device to an alternate parent device ("−2"), or maintains attachment with its preferred parent device ("+2"), alternately the parent stability may be set if zero "0" if the parent network devices have equal weight and the positioning of the mesh network device "j" between its parents results in no adverse impact.

Based on the above examples, the processor circuit 32 of the management device 16 and/or 22 in operation 42a can generate a mesh quality index "MQI_j" within the range between and including "+4" and "−4", i.e. "−4≤MQI_j≤+4". Since the mesh quality index "MQI_j" can include an upstream component "U_MQI_j" and a downstream component "D_MQI_j", then if each component is in the range of "+4" and "−4", i.e. "−4≤U_MQI_j≤+4" and "−4≤D_MQI_j≤+4", then the aggregate range of the mesh quality index "MQI_j" (combining the upstream and downstream components) can be "−8≤MQI_j≤+8". Comparison of upstream and downstream components enables identification of asymmetric instability influences, and enables use of different remediation efforts for upstream vs. downstream traffic; different weighting factors also can be applied for upstream or downstream components, for example due to priority or relative position of the mesh network device "j"

within the DODAG topology. Hence, the use of upstream or downstream components enables separate and distinct upstream and downstream optimizations for each mesh network device "j".

Other variations of mesh quality index determination can be applied, for example layer 4 through layer 7 (L4/L7) performance metrics can be combined with lower layer performance metrics (e.g., network layer L3, link layer L2, physical layer L1).

As described previously, the management device 16 and/or 22 in operation 42a can update and average the mesh quality index "MQI_j" over a short-term (ST) time in order to obtain an accurate historical value that can trend over the short-term (ST) time (e.g., one day, one week, etc.), resulting in generation of the mesh quality index "MQI_j" as a statistical mean that can have a corresponding determined standard deviation ("MQI_ST_DEV_j"), and possibly a predictable pattern over a short time interval.

The processor circuit 32 of the management device 16 and/or 22 in operation 42b can generate a node stability contribution level ("NSCL_j") as an arithmetic mean of the mesh quality index "MQI_j" relative to the long-term capability of the corresponding mesh network device, the long-term time interval (LT) for the measured for example as at least an order of magnitude greater than the short term (ST) interval, e.g., "LT≥10*ST" (where "*" indicates a multiplication operation). For example if the short term interval used to calculate the mesh quality index "MQI_j" is one week ("ST=1 week"), the long term interval used to calculate the node stability contribution level ("NSCL_j") as the arithmetic mean of the mesh quality index "MQI_j" can be ten (10) weeks ("LT≥10*ST≥10 weeks") or more. The processor circuit 32 of the management device 16 and/or 22 in operation 42b also can generate a corresponding standard deviation ("NSCL_ST_DEV_j") for the node stability contribution level ("NSCL_j") over the associated long term interval.

In response to calculating the node stability contribution level ("NSCL_j") and associated standard deviation ("NSCL_ST_DEV_j") for each mesh network device "j" 14 in the wireless mesh network device 14, the processor circuit 32 of the management device 16 and/or 22 in operation 42c can determine, on a per-PAN basis, the mesh instability source device as having a corresponding worst influence of the node stability contribution in the mesh network. The processor circuit 32 of the management device 16 and/or 22 in operation 42 can identify the worst influence of the node stability contribution, for example based on identifying the mesh network device 14 exhibiting the worst deterioration in its node stability contribution level ("NSCL_j") relative to the corresponding parent node stability contribution level ("NSCL_j_Parent"), and relative to the number of child network devices in the subDAG of the mesh network device 14.

Figure 4:
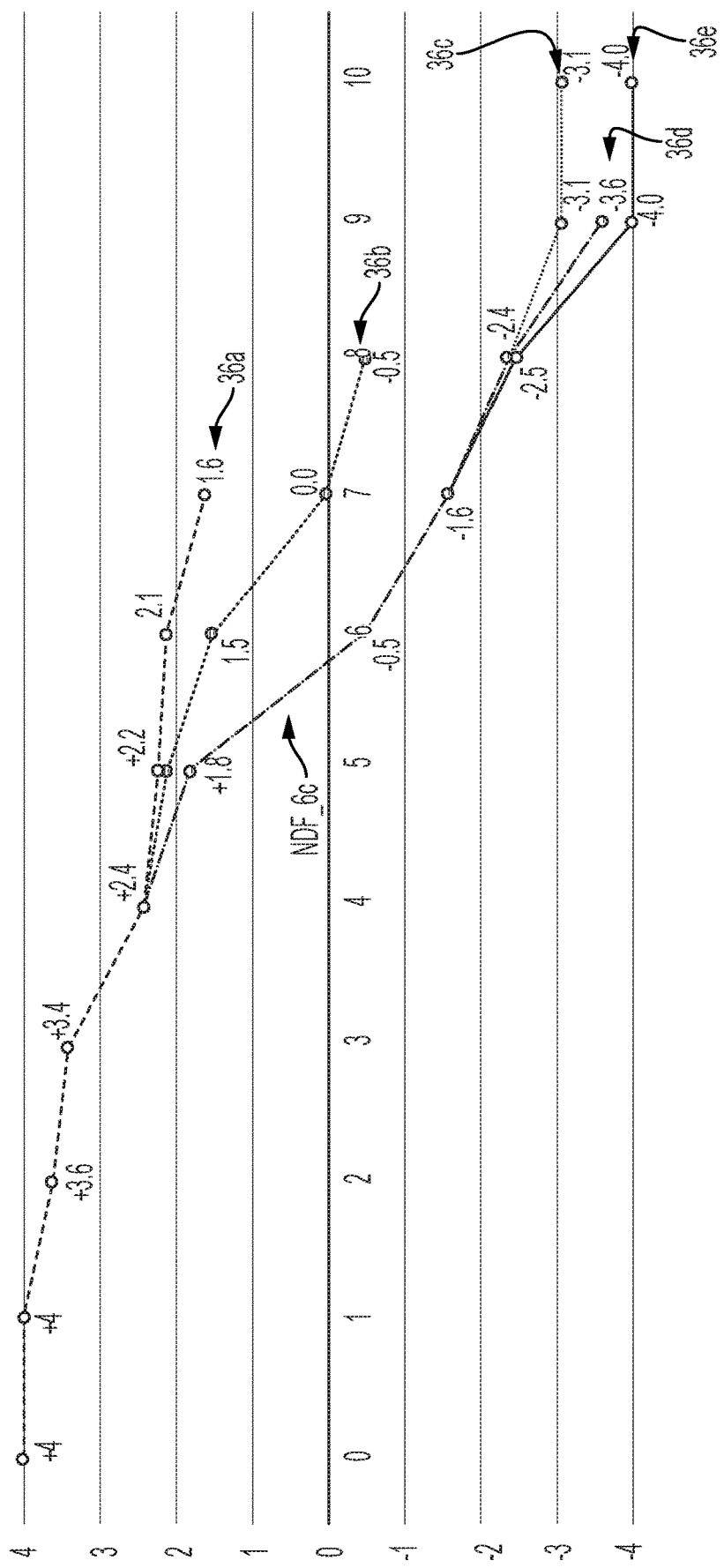
FIG. 4 illustrates an example of deterioration of node stability contributions in mesh network devices in a mesh network.

FIG. 4 illustrates an example of deterioration of node stability contributions levels (NSCL) in mesh network devices 14 positioned within a DODAG via different multihop paths 36 in a wireless mesh data network 10, according to an example embodiment. The X-axis represents hop count from the DAG root 12, and the Y-axis represents the node stability contributions (NSCL) for an identified wireless mesh network device 14. Hence, FIG. 4 illustrate that the multihop paths 36a, 36b, 36c, 36d, and 36e share the same DAG root 12 (at hop count) and the same parent wireless mesh network devices 14 at hop counts "1", "2", "3", and "4". As described previously, each wireless mesh network device 14 can inherit the instability its parent network device, hence the processor circuit 32 of the management device 16 and/or 22 in operation 42c identifies the wireless mesh network device 14 demonstrating the worst deterioration in its NSCL relative to its one-hop parent.

The DAG root 12 is illustrated in FIG. 4 as having a corresponding NSCL value of "NSCL_Root=+4", and its first-hop child (depth=hop-count=1) also is illustrated as having a corresponding NSCL value of "NSCL_D1=+4", hence the first-hop child encounters zero deterioration in stability within the wireless mesh data network 10 (NSCL_D1−NSCL_Root=0). The next-hop child (depth=hop-count=2) is illustrated as having a corresponding NSCL value of "NSCL_D2=+3.6", resulting in a deterioration in stability of "−0.4" (NSCL_D2−NSCL_D1=−0.4). The next-hop child (depth=hop-count=3) is illustrated as having a corresponding NSCL value of "NSCL_D3=+3.4" (a deterioration in stability of "−0.2" (NSCL_D3−NSCL_D2=−0.2)), and the next-hop child (depth=hop-count=4) is illustrated as having a corresponding NSCL value of "NSCL_D4=+2.4" (a deterioration in stability of "−1.0" (NSCL_D4−NSCL_D3=−1.0)).

The memory circuit 34 at "depth=4 hop counts" and having the corresponding NSCL value of "NSCL_D4=+2.4" is illustrated as having three (3) child network devices (at depth=hop count=5) for the respective paths 36a, 36b, and 36c. The next hop child (at depth=hop count=5) along path 36a has a corresponding NSCL value of NSCL_D5a=+2.2" (a deterioration in stability of "−1.0"), etc.

Table 1 summarizes the NSCL values and associated deterioration in stability (i.e., Node Decline Factor (NDF) for each of the child network devices of FIG. 4, including the worst change in NSCL encountered by the child node along paths 36c, 36d, and 36e at the depth of 6 hop counts:

TABLE 1

NSCL Values and Changes In Child Devices

| Hop Count | NSCL Value | Node Decline Factor (NDF) |
|---|---|---|
| 0 | NSCL_Root = +4 | N/A |
| 1 | NSCL_D1 = +4 | 0 |
| 2 | NSCL_D2 = +3.6 | −0.4 |
| 3 | NSCL_D3 = +3.4 | −0.2 |
| 4 | NSCL_D4 = +2.4 | −1.0 |
| 5 (Child on Path A) | NSCL_D5a = +2.2 | −0.2 |
| 5 (Child on Path B) | NSCL_D5b = +2.1 | −0.3 |
| 5 (Child on Paths C, D, E) | NSCL_D5c = +1.8 | −0.6 |
| 6 (Child on Path A) | NSCL_D6a = +2.1 | −0.1 |
| 6 (Child on Path B) | NSCL_D6b = +1.5 | −0.6 |
| 6 (Child on Paths C, D, E) | NSCL_D6c = −0.5 | −2.3 |
| 7 (Child on Path A) | NSCL_D7a = +1.6 | −0.5 |
| 7 (Child on Path B) | NSCL_D7b = 0.0 | −1.5 |
| 7 (Child on Paths C, D, E) | NSCL_D7c = −1.6 | −1.1 |
| 8 (Child on Path B) | NSCL_D8b = −0.5 | −0.5 |
| 8 (Child on Paths C, D) | NSCL_D8c = −2.4 | −0.8 |
| 8 (Child on Path E) | NSCL_D8e = −2.5 | −0.9 |
| 9 (Child on Path C) | NSCL_D9c = −3.1 | −0.6 |
| 9 (Child on Path D) | NSCL_D9d = −3.6 | −1.2 |
| 9 (Child on Path E) | NSCL_D9e = −4.0 (Max) | −1.5 |
| 10 (Child on Path C) | NSCL_D10c = −3.1 | 0.0 |
| 10 (Child on Path E) | NSCL_D10e = −4.0 (Max) | 0.0 (Max Reached) |

As shown in Table 1 and FIG. 4, the wireless mesh network devices 14 having NSCL values below a prescribed value (e.g., below NSCL=−2.0") can be determined as requiring corrective action. As shown in Table 1 and FIG. 4, since the NSCL values of child network devices include inheriting the instability of parent network devices, the processor circuit 32 of the management device 16 and/or 22 in operation 42c can determine that the child wireless mesh network device 14 at "depth=6" that provides a path to the DAG root 12 for paths 36c, 36d, and 36e (hereinafter child "D6_c") suffers the worst deterioration in stability (i.e., worst change in NSCL, or worst Node Decline Factor) of "NDF_6c=NSCL_D6c−NSCL_D5c=−2.3". The child "D6_c" wireless mesh network device 14 also provides the greatest negative influence (i.e., worst influence MAX_NEG_INF of the node stability contribution factor NSCF), based on the Node Decline Factor (NDF) relative to the number of children in its subDAG (C_6c=8), i.e., "MAX_NEG_INF=NDF_6c*C_6c=−18.4". Hence, the processor circuit 32 of the management device 16 and/or 22 in operation 42c can identify the child "D6_c" 14 as having the worst influence of the node stability contribution in the mesh network 10, such that the identified child "D6_c" is identified as the mesh instability source device that adds a substantial instability influence that substantially degrades network communications for at least its child network devices (along paths 36c, 36d, and 36e) in the wireless mesh data network 10.

In response to identifying the child "D6_c" 14 as the mesh instability source in the wireless mesh data network 10, the processor circuit 32 of the management device 16 and/or 22 in operation 44 can eliminate the substantial instability influence introduced by the mesh instability source "D6_c" 14, based on determining in operation 44a a remediation solution for the mesh instability source device "D6_c" 14, and causing in operation 44b the remediation solution to be implemented for the mesh instability source device "D6_c" 14. For example, the processor circuit 32 of the management device 16 and/or 22 in operation 44a can execute regression analysis of each KPI communications parameter (i.e., mesh stability metric) between the mesh instability source device "D6_c" 14 and its parent device "D5_c" 14 that is applied in operation 40 in determining the node stability contribution that provides the worst influence: the regression analysis can cause the processor circuit 32 of the management device 16 and/or 22 to identify one or more communications parameters that need to be changed in the mesh instability source device "D6_c" 14 and/or its parent device "D5_c" 14 in order to provide the remediation solution to remove the substantial instability influence in the wireless mesh data network 10 by the mesh instability source device "D6_c".

The processor circuit 32 of the management device 16 and/or 22 in operation 44b can cause the remediation solution to be implemented based on sending one or more instructions to the mesh instability source device "D6_c" 14 and/or its parent device "D5_c" 14 (and/or the DAG root 12 and/or any other wireless mesh network device 14 in the wireless mesh data network 10, as needed) to implement the remediation solution. Example remediation solutions can include the management device 16 and/or 22 dynamically adjusting the objective function executed by the mesh instability source device "D6_c" 14 and/or its parent device "D5_c" 14, changing a link layer channel hopping sequence, changing load balancing by child nodes, etc.

FIG. 3B illustrates additional optimization operations that can be executed by the processor circuit 32 of the management device 16 and/or 22, according to an example embodiment.

The processor circuit 32 of the management device 16 and/or 22 in operation 46 can cause one or more of the mesh network devices "j" 14 to output its corresponding node stability contribution level "NSCL_j" and/or its corresponding mesh quality index "MQI_j" as an objective function parameter in an advertisement message (e.g., a DIO message according to RFC 6550), for example based on the management device 16 and/or 22 sending to the mesh network device "j" 14 its corresponding node stability contribution level "NSCL_j" and/or its corresponding mesh quality index "MQI_j"; hence, a child network device 14 can execute a prescribed NSCL (and/or MQI) objective function, for example requiring that any parent device must be six (6) hops or less (or equivalent rank), and/or must have an NSCL value of at least "+1.5", and/or an MQI value of at least "+1.0". Hence, the advertised DIO message specifying the corresponding node stability contribution level "NSCL_j" and/or its corresponding mesh quality index "MQI_j" can cause a new mesh child device 14 to selectively join the advertising mesh network device 14 based on the corresponding node stability contribution (and/or mesh quality index) relative to a prescribed objective function.

The processor circuit 32 of the management device 16 and/or 22 in operation 48 can send to one or more of the mesh network devices "j" 14 its corresponding mesh quality index "MQI_j" and corresponding standard deviation "MQI_ST_DEV_j" with an alert setting in cases where a wireless mesh network device 14 is able to measure its own mesh quality; hence, the processor circuit 32 of the management device 16 and/or 22 in operation 48 can cause a mesh network device "j" to generate and output an alert to the management device 16 and/or 22 (or another identified administrator entity) in response to the mesh network device "j" determining that its measured mesh quality ("MMQI_j") is degrading beyond the standard deviation "MQI_ST_DEV_j" of the corresponding mesh quality index "MQI_j" (e.g., send alert if ("MMQI_j<MQI_j−MQI_ST_DEV_j"). The alert can cause the management device 16 and/or 22 to proactively resolve an instability in the wireless mesh data network 10 that is encountered in the short term (ST) interval described previously. The above-described alert settings also can be set for upstream-specific and downstream-specific alerts based on the associated upstream mesh quality index "U_MQI_j" and downstream mesh quality index "D_MQI_j", respectively.

In cases of a more substantial deterioration, the processor circuit 32 of the management device 16 and/or 22 in operation 50 also can send an alert to an administrator device in response to detecting that the message quality index "MQI_j" for a mesh network device "j" deteriorates beyond the standard deviation set for the node stability contribution level "NSCL_ST_DEV_j" over the associated long-term interval.

The processor circuit 32 of the management device 16 and/or 22 in operation 52 also can cause optimization of a tree-based topology for the mesh network based on the node stability contribution levels (NSCL) of the respective mesh network devices, for example based on generating an aggregate Personal Area Network (PAN) stability based on the node stability contributions of the respective mesh network devices relative to a first tree-based topology. In particular, each of the NSCL values can be aggregated (i.e., summed) to obtain an aggregate PAN stability index. As described previously, in cases where the wireless mesh data network 10 includes multiple available PANs with respective DAG roots 12, the processor circuit 32 of the management device 16 and/or 22 in operation 52 can send an instruction to each DAG root 12 to advertise in its DIA the corresponding PAN stability index that represents the sum of all NSCL values of attached wireless mesh network devices 14 in the corresponding PAN. Hence, new wireless mesh network devices 14 can decide whether to join one of multiple PANs in a mesh network based on the corresponding PAN stability index advertised in the DIO.

The NSCL values also can be used to establish a baseline for an "acceptable" PAN stability for identifying acceptable stability performance for both upstream and downstream paths, and also relative to hop counts from the DAG root 12. Hence, a newly-deployed PAN having a lower than acceptable PAN stability value can be used to indicate that corrective action is needed.

The example embodiments also enable the accumulation of NSCLs over time to be used as historical data that can be used to predict the most likely tree structure and the associated stability results in terms of expected NSCL values. Accumulation of NSCLs can be used to proactively design a DODAG with optimized paths before performance degradation is encountered, thus improving the stability and the overall efficiency of the wireless mesh data network 10. In one example, seasonality can be anticipated and network segments can be redirected to an improved alternate path before degradation is encountered. Such redirection can affect differently the upstream and downstream directions, also accounting for the expected traffic type/volume/criticality.

The example embodiments also enable the accumulation of remediation solutions by the management device 16 and/or 22 to be used as historical data for identifying causes of mesh network instability and associated remediation solutions.

Figure 5:
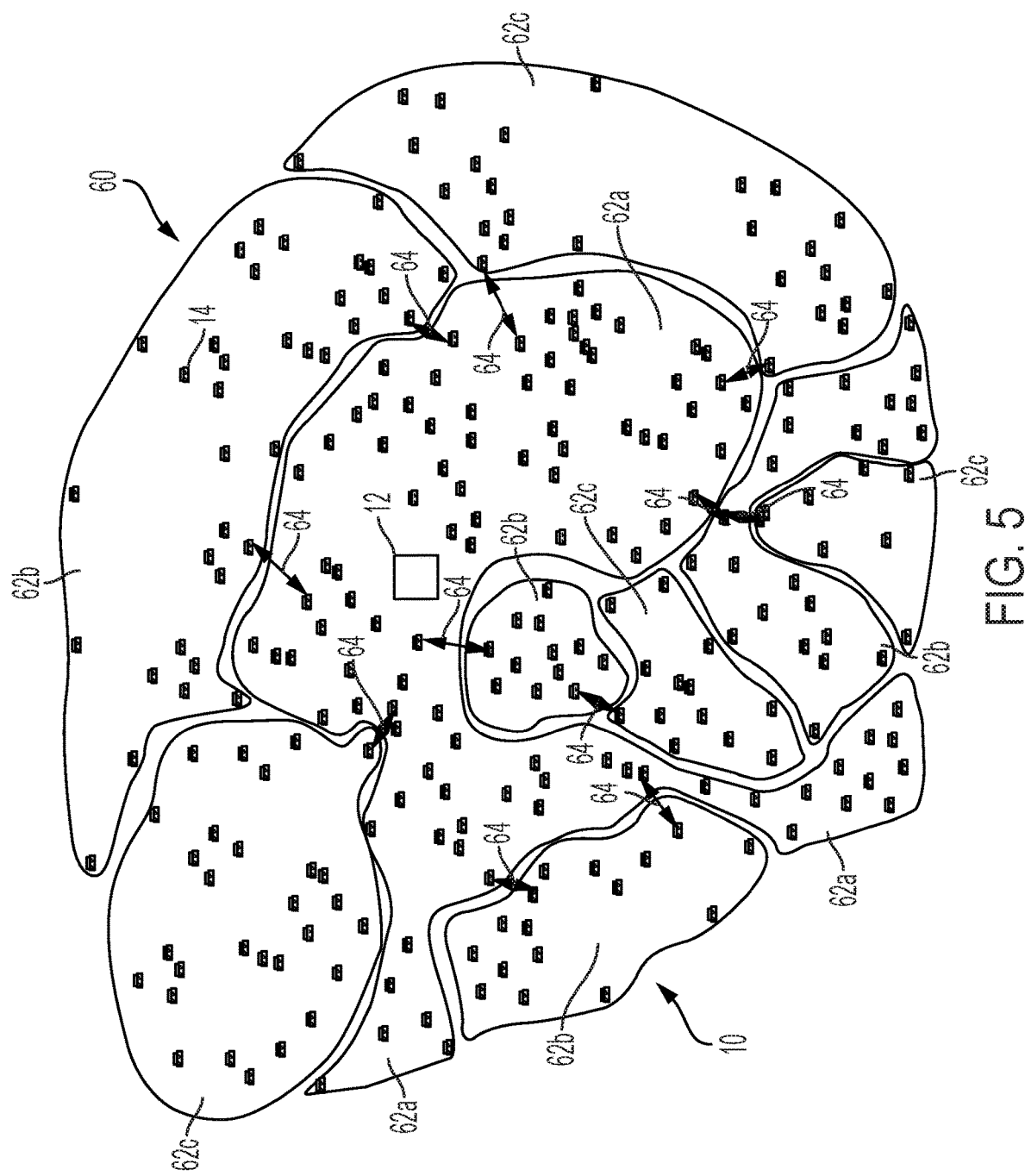
FIG. 5 illustrates an example network stability map having different stability regions based on node stability contribution levels, according to an example embodiment.

The example embodiments also enable the processor circuit 32 of the management device 16 and/or 22 to establish a network stability map 60, illustrated in FIG. 5. FIG. 5 illustrates an example network stability map 60 having different stability regions 62a, 62b, 62c, based on node stability contribution levels (NSCLs), according to an example embodiment. The network stability map 60 includes the DAG root 12 and the wireless mesh network devices 14 (illustrated as dashed lines). The network stability map 60 also includes different stability regions 62a, 62b, 62c that are interconnected by mesh network devices 14 having unstable boundary links 64. The stability region 62a can identify wireless mesh network devices 14 having highly stable NSCLs within the range of "+4≥NSCL1>+1", the stability region 62b can identify wireless mesh network devices 14 having marginally stable NSCLs within the range of "+1≥NSCL2>−1.0", and the stability region 62c can identify wireless mesh network devices 14 having relatively unstable NSCLs within the range of "−1.0≥NSCL2>−4.0". The management device 16 and/or 22 also can identify the parent-child device pairs in the wireless mesh data network 10 that interface at the unstable boundary links 64, enabling a prioritized evaluation of the parent-child device pairs of the unstable boundary links 64 for determining a remediation solution for the mesh instability source devices at the unstable boundary links 64.

According to example embodiments, automated optimization of a large-scale mesh network can be automatically implemented based identifying a mesh instability source that has the worst influence of node stability contribution in a mesh network, based on determining the influence of a node stability contribution of a mesh network device on child mesh network devices.

Although the example embodiments describe use of RPL according to RFC 6550 for constructing the tree-based IP-based network layer of FIG. 1, other protocols can be used to establish the tree-based topology.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
identifying, by an apparatus, a mesh instability source device that adds a substantial instability influence that substantially degrades network communications in a mesh network, including:
determining, for each mesh network device in the mesh network, a corresponding node stability contribution that identifies a long-term capability of the corresponding mesh network device to provide reliable communications for other mesh network devices in the mesh network, and determining a corresponding influence of the node stability contribution on child mesh network devices relying on the corresponding mesh network device for connectivity in the mesh network, and
identifying the mesh instability source device as having a corresponding worst influence of the node stability contribution in the mesh network; and
eliminating, by the apparatus, the substantial instability influence in the mesh network based on determining a remediation solution for the mesh instability source device, and causing the remediation solution to be implemented for the mesh instability source device.

2. The method of claim 1, wherein the determining includes:
generating for each mesh network device a corresponding mesh quality index that identifies a capability of the mesh network device over time to provide reliable communications for the other mesh network devices; and
generating the node stability contribution as an arithmetic mean of the mesh quality index relative to the long-term capability of the corresponding mesh network device.

3. The method of claim 2, wherein the mesh quality index is based on at least two or more of application layer connectivity, Personal Area Network (PAN) stability identifying whether the mesh network device maintains connection within a single PAN or switches between different PANs, parent device stability identifying whether the mesh network device maintains connection with a single parent device or switches between different parent devices, or transmission retries.

4. The method of claim 2, wherein the mesh quality index includes an upstream mesh quality index factor for upstream mesh network devices toward a root of the mesh network, and a downstream mesh quality index factor for downstream mesh network devices away from the root.

5. The method of claim 1, further comprising:
causing one or more of the mesh network devices to output one or more of its corresponding node stability contribution, or a mesh quality index that identifies a capability of the mesh network device over time to provide reliable communications for the other mesh network devices, as one or more objective function parameters in an advertisement message, the one or more of the node stability contribution or the mesh quality index causing a new child mesh network device to selectively join a mesh network device based on the one or more objective function parameters relative to a prescribed objective function.

6. The method of claim 1, further comprising:
causing one or more of the mesh network devices to output an alert in response to determining a mesh quality index, measured by the corresponding one or more mesh network devices, is degraded beyond one standard deviation of the corresponding node stability contribution.

7. The method of claim 1, further comprising causing optimization of a tree-based topology for the mesh network based on the node stability contributions of the respective mesh network devices, including generating an aggregate Personal Area Network (PAN) stability based on the node stability contributions of the respective mesh network devices relative to a first tree-based topology.

8. The method of claim 1, wherein the remediation solution is determined based on regression analysis of each communications parameter that is applied in determining the node stability contribution that provides the worst influence.

9. An apparatus implemented as a physical machine, the apparatus comprising:
non-transitory machine readable media configured for storing executable machine readable code;
a device interface circuit configured for receiving data associated with mesh network devices in a mesh network; and
a processor circuit configured for executing the machine readable code, and when executing the machine readable code operable for:
identifying a mesh instability source device that adds a substantial instability influence that substantially degrades network communications in the mesh network, including:
determining, for each mesh network device in the mesh network, a corresponding node stability contribution that identifies a long-term capability of the corresponding mesh network device to provide reliable communications for other mesh network devices in the mesh network, and determining a corresponding influence of the node stability contribution on child mesh network devices relying on the corresponding mesh network device for connectivity in the mesh network, and
identifying the mesh instability source device as having a corresponding worst influence of the node stability contribution in the mesh network; and
eliminating the substantial instability influence in the mesh network based on determining a remediation solution for the mesh instability source device, and causing the remediation solution to be implemented for the mesh instability source device.

10. The apparatus of claim 9, wherein the processor circuit is configured for:
generating for each mesh network device a corresponding mesh quality index that identifies a capability of the mesh network device over time to provide reliable communications for the other mesh network devices; and
generating the node stability contribution as an arithmetic mean of the mesh quality index relative to the long-term capability of the corresponding mesh network device.

11. The apparatus of claim 9, wherein the processor circuit further is configured for causing one or more of the mesh network devices to output one or more of its corresponding node stability contribution, or a mesh quality index that identifies a capability of the mesh network device over time to provide reliable communications for the other mesh network devices, as one or more objective function parameters in an advertisement message, the one or more of the node stability contribution or the mesh quality index causing a new child mesh network device to selectively join a mesh network device based on the one or more objective function parameters relative to a prescribed objective function.

12. The apparatus of claim 9, wherein the processor circuit further is configured for causing one or more of the mesh network devices to output an alert in response to determining a mesh quality index, measured by the corresponding one or more mesh network devices, is degraded beyond one standard deviation of the corresponding node stability contribution.

13. One or more non-transitory tangible media encoded with logic for execution by a machine and when executed by the machine operable for:
identifying, by the machine, a mesh instability source device that adds a substantial instability influence that substantially degrades network communications in a mesh network, including:
determining, for each mesh network device in the mesh network, a corresponding node stability contribution that identifies a long-term capability of the corresponding mesh network device to provide reliable communications for other mesh network devices in the mesh network, and determining a corresponding influence of the node stability contribution on child mesh network devices relying on the corresponding mesh network device for connectivity in the mesh network, and
identifying the mesh instability source device as having a corresponding worst influence of the node stability contribution in the mesh network; and
eliminating, by the machine, the substantial instability influence in the mesh network based on determining a remediation solution for the mesh instability source device, and causing the remediation solution to be implemented for the mesh instability source device.

14. The one or more non-transitory tangible media of claim 13, wherein the determining includes:
generating for each mesh network device a corresponding mesh quality index that identifies a capability of the mesh network device over time to provide reliable communications for the other mesh network devices; and
generating the node stability contribution as an arithmetic mean of the mesh quality index relative to the long-term capability of the corresponding mesh network device.

15. The one or more non-transitory tangible media of claim 14, wherein the mesh quality index is based on at least two or more of application layer connectivity, Personal Area Network (PAN) stability identifying whether the mesh network device maintains connection within a single PAN or switches between different PANs, parent device stability identifying whether the mesh network device maintains connection with a single parent device or switches between different parent devices, or transmission retries.

16. The one or more non-transitory tangible media of claim 14, wherein the mesh quality index includes an upstream mesh quality index factor for upstream mesh network devices toward a root of the mesh network, and a downstream mesh quality index factor for downstream mesh network devices away from the root.

17. The one or more non-transitory tangible media of claim 13, further operable for:

causing one or more of the mesh network devices to output one or more of its corresponding node stability contribution, or a mesh quality index that identifies a capability of the mesh network device over time to provide reliable communications for the other mesh network devices, as one or more objective function parameters in an advertisement message, the one or more of the node stability contribution or the mesh quality index causing a new child mesh network device to selectively join a mesh network device based on the one or more objective function parameters relative to a prescribed objective function.

18. The one or more non-transitory tangible media of claim 13, further operable for:
causing one or more of the mesh network devices to output an alert in response to determining a mesh quality index, measured by the corresponding one or more mesh network devices, is degraded beyond one standard deviation of the corresponding node stability contribution.

19. The one or more non-transitory tangible media of claim 13, further operable for causing optimization of a tree-based topology for the mesh network based on the node stability contributions of the respective mesh network devices, including generating an aggregate Personal Area Network (PAN) stability based on the node stability contributions of the respective mesh network devices relative to a first tree-based topology.

20. The one or more non-transitory tangible media of claim 13, wherein the remediation solution is determined based on regression analysis of each communications parameter that is applied in determining the node stability contribution that provides the worst influence.

* * * * *